United States Patent
Fuchida et al.

(10) Patent No.: US 12,548,981 B2
(45) Date of Patent: Feb. 10, 2026

(54) METHOD FOR MANUFACTURING SEMICONDUCTOR LASER DEVICE, AND SEMICONDUCTOR LASER DEVICE

(71) Applicant: Mitsubishi Electric Corporation, Tokyo (JP)

(72) Inventors: Ayumi Fuchida, Tokyo (JP); Tadashi Takase, Tokyo (JP); Naoki Nakamura, Tokyo (JP); Ryoko Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1289 days.

(21) Appl. No.: 17/054,807

(22) PCT Filed: Jul. 31, 2018

(86) PCT No.: PCT/JP2018/028574
§ 371 (c)(1),
(2) Date: Nov. 12, 2020

(87) PCT Pub. No.: WO2020/026330
PCT Pub. Date: Feb. 6, 2020

(65) Prior Publication Data
US 2021/0273414 A1    Sep. 2, 2021

(51) Int. Cl.
*H01S 5/223* (2006.01)
*H01S 5/227* (2006.01)
*H01S 5/32* (2006.01)

(52) U.S. Cl.
CPC .......... *H01S 5/2275* (2013.01); *H01S 5/3211* (2013.01)

(58) Field of Classification Search
CPC ............................................. H01S 5/223–2275
See application file for complete search history.

(56) References Cited

U.S. PATENT DOCUMENTS

| | | |
|---|---|---|
| 4,864,581 A | 9/1989 | Nelson et al. |
| 4,935,936 A | 6/1990 | Nelson et al. |

(Continued)

FOREIGN PATENT DOCUMENTS

| | | |
|---|---|---|
| CN | 105305230 A | 2/2016 |
| JP | S63-500279 A | 1/1988 |

(Continued)

OTHER PUBLICATIONS

International Search Report issued in PCT/JP2018/028574; mailed Oct. 30, 2018.

(Continued)

*Primary Examiner* — Minsun O Harvey
*Assistant Examiner* — Stephen Sutton Kotter
(74) *Attorney, Agent, or Firm* — Studebaker Brackett PLLC

(57) ABSTRACT

The present application is provided with: a ridge laminated with a first conductivity type cladding layer, an active layer, and a second conductivity type first cladding layer in order and having a top portion formed to be flat; a first buried layer buried on both side areas of the ridge; a second buried layer covering the first buried layer and protruding toward the center of the ridge and toward a top portion of the ridge to form an opening formed by protruding portions facing each other; and a second conductivity type second cladding layer buried on the second buried layer and in the opening, wherein a surface of the second buried layer on a side to the top portion of the ridge is formed so as to fit within a surface of the second conductivity type first cladding layer.

12 Claims, 12 Drawing Sheets

(56) References Cited

U.S. PATENT DOCUMENTS

| | | | | |
|---|---|---|---|---|
| 4,984,244 | A * | 1/1991 | Yamamoto | H01S 5/227 372/45.01 |
| 5,693,558 | A * | 12/1997 | Lee | H01S 5/227 438/40 |
| 5,706,304 | A * | 1/1998 | Ohkura | H01S 5/2231 372/45.012 |
| 5,838,028 | A * | 11/1998 | Horie | H01S 5/2231 372/45.01 |
| 2014/0302628 | A1 | 10/2014 | Takeuchi et al. | |
| 2015/0037919 | A1 * | 2/2015 | Ishiura | H01S 5/3213 438/39 |
| 2016/0028213 | A1 * | 1/2016 | Sakaino | H01S 5/2226 372/45.012 |
| 2017/0207604 | A1 | 7/2017 | Watanabe | |

FOREIGN PATENT DOCUMENTS

| | | |
|---|---|---|
| JP | H02-082679 A | 3/1990 |
| JP | H05-275796 A | 10/1993 |
| JP | H09-008398 A | 1/1997 |
| JP | 2001-284735 A | 10/2001 |
| JP | 2005-167050 A | 6/2005 |
| JP | 2011-249766 A | 12/2011 |
| JP | 2016-027653 A | 2/2016 |
| JP | 2017-130657 A | 7/2017 |

OTHER PUBLICATIONS

An Office Action mailed by China National Intellectual Property Administration on Dec. 3, 2021, which corresponds to Chinese Patent Application No. 201880095693.3 and is related to U.S. Appl. No. 17/054,807; with English language translation.

* cited by examiner

METHOD FOR MANUFACTURING SEMICONDUCTOR LASER DEVICE, AND SEMICONDUCTOR LASER DEVICE

TECHNICAL FIELD

The present application relates to a semiconductor laser device and a method for manufacturing the same.

BACKGROUND ART

A conventional semiconductor laser device has a structure in which a blocking layer is buried in a stripe-shaped ridge having an active layer (for example, refer to Patent Document 1). In the conventional semiconductor laser, for example, the ridge is formed using a mask made of $SiO_2$, and then the blocking layer is formed by laminating Fe-doped InP and n-type InP in this order using the mask as a selective growth mask. Further, after reduction of the width of the selective growth mask by etching a part of the selective growth mask, a part of the upper face portion of the p-type InP cladding layer on the upper side of the active layer is etched to form the upper faces of both side portions lower than the upper face of the central portion of the p-type InP cladding layer. Furthermore, a structure in which the blocking layer is buried in the stripe-shaped ridge having the active layer can be formed by burying p-type InP on the ridge stripe after laminating an n-type InP blocking layer using the mask reduced in the width as the selective growth mask.

CITATION LIST

Patent Document

Patent Document 1: JP 2011-249766A

SUMMARY OF THE INVENTION

Technical Problem

In order to reduce an operating current of the semiconductor laser, it is effective to reduce the width of a hole leakage path between the active layer and the n-type blocking layer, and in Patent Document 1, the width of the hole leakage path is reduced by thinning a part of the upper face portion of the p-type cladding layer. However, in the method described above, when etching a part of the upper face portion of the p-type cladding layer, etching cannot be stopped with good controllability, and it is difficult to leave the p-type cladding layer with a desired thickness. Further, since the etching rate may not be uniform on the wafer surface, it is difficult to leave the p-type cladding layer with a desired thickness over the entire wafer surface. In particular, if the p-type cladding layer is etched to a position corresponding to the upper face of the active layer without leaving the p-type cladding layer, electron leakage occurs due to the connection between the active layer and the n-type blocking layer, and the operating current cannot be reduced. Further, when etching a part of the upper face portion of the p-type cladding layer, a buried layer near the p-type cladding layer is simultaneously etched, so that the bottom face of an tip end of the n-type blocking layer formed on the buried layer comes closer to the active layer. Therefore, electron leakage from the side of the active layer to the n-type InP blocking layer through the buried layer increases.

An object of the present application is to provide a semiconductor laser device and a method of manufacturing the same, wherein the width of the hole leakage path is reduced and the electron leakage is reduced.

Solution to Problem

A method for manufacturing a semiconductor laser device disclosed in the present application includes:
a ridge forming step in which a laminated structure is formed by laminating a first conductivity type cladding layer of a first conductivity type, an active layer, a second conductivity type first cladding layer of a second conductivity type opposite to the first conductivity type, and a cap layer made of a semiconductor material different from the second conductivity type first cladding layer in order on the surface of a first conductivity type substrate of the first conductivity type, and both side areas of the laminated structure are etched to a position closer to the first conductivity type substrate than the active layer to form a ridge;
a ridge burying step in which a first buried layer of a conductivity type different from the first conductivity type is buried in both side areas of the ridge to a position higher than the second conductivity type first cladding layer;
a second buried layer forming step in which the second buried layer of the first conductivity type is grown so as to cover the ridge and the first buried layer;
a cap layer exposing step in which the second buried layer at a position corresponding to the center of the ridge is etched to expose the cap layer at the center of the ridge;
a first cladding layer exposing step in which the cap layer exposed at the center of the ridge is etched to expose the second conductivity type first cladding layer; and
a second cladding layer forming step in which a second conductivity type second cladding layer of the second conductivity type is grown so as to be buried on the second buried layer, the second conductivity type first cladding layer exposed at the center of the ridge and an exposed side face of the cap layer located between the second buried layer and the second conductivity type first cladding layer.

A semiconductor laser device disclosed in the present application includes:
a ridge that is laminated with a first conductivity type cladding layer of a first conductivity type, an active layer, and a second conductivity type first cladding layer of a second conductivity type opposite to the first conductivity type in order on a first conductivity type substrate of the first conductivity type, and has a flat top portion formed so as to protrude from a position closer to the first conductivity type substrate than the active layer;
a first buried layer that is buried on both side areas of the ridge to a position higher than the second conductivity type first cladding layer;
a second buried layer that covers the first buried layer, and protrudes toward the center of the ridge to form an opening as a current constricting window formed by protruding portions facing each other;
a second conductivity type second cladding layer of the second conductivity type that is buried on the second buried layer and in the current constricting window; and
a cap layer of the second conductivity type that is sandwiched between the second buried layer and the second conductivity type first cladding layer and located on both sides of the top portion of the ridge, wherein the second conductivity type second cladding layer is contract with the second conductivity type first cladding layer at the center of the top portion of the ridge.

Advantageous Effects of Invention

According to the semiconductor laser device and a method for manufacturing the same disclosed in the present application, an advantageous effect is obtained in that the semiconductor laser device in which the width of the hole leakage path is reduced and the electron leakage is reduced, and a method of manufacturing the semiconductor laser device can be provided.

DESCRIPTION OF EMBODIMENTS

Embodiment 1

Figure 1:
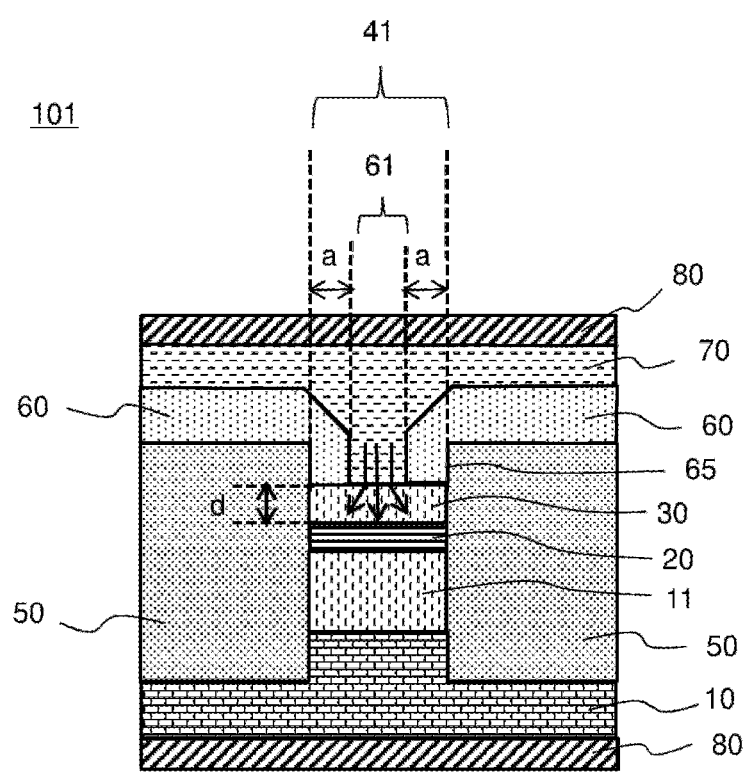
FIG. 1 is a cross-sectional view showing a schematic structure of a semiconductor laser device according to Embodiment 1.

FIG. 1 is a cross-sectional view showing a structure of a semiconductor laser device 101 according to Embodiment 1. As shown in FIG. 1, in the semiconductor laser device 101, a ridge 41 having an n-type InP cladding layer 11, an active layer 20, and a p-type InP first cladding layer 30 laminated in this order is provided on an n-type InP substrate 10. A first buried layer 50 is buried in the side areas of the ridge 41 to a position higher than the p-type InP first cladding layer 30, and an n-type InP second buried layer 60 is provided on the first buried layer 50. A part of the n-type InP second buried layer 60 protrudes over the ridge 41, and the upper face of the p-type InP first cladding layer 30, that is, a top portion of the ridge 41 is exposed at the center of the ridge 41. Further, a p-type InP second cladding layer 70 is buried on the n-type InP second buried layer 60 and the p-type InP first cladding layer 30 exposed at the center of the ridge 41. Electrodes 80 are provided each under the n-type InP substrate 10 and on the p-type InP second cladding layer 70.

The n-type InP substrate 10 is a substrate S-doped with an impurity concentration of $4.0 \times 10^{18}$ cm$^{-3}$ and has a (001) plane as the major surface. The n-type InP cladding layer 11 is made of InP on the n-type InP substrate 10, has a thickness of 0.3 μm, and is S-doped with the concentration of $4.0 \times 10^{18}$ cm$^{-3}$. The active layer 20 is made of an AlGaInAs-based or an InGaAsP-based material containing multiple quantum wells. The p-type InP first cladding layer 30 is made of InP, has a thickness of 0.02 μm in thickness, and is Zn-doped with the concentration of $1.0 \times 10^{18}$ cm$^{-3}$. The ridge 41 is typically about 0.8 to 1.4 μm in width. Note that, the values of the concentration of the doping, thickness, width, and the like are typical examples, and are not limited to the values and ranges that are exemplified.

The first buried layer 50 is made of p-type InP that is Zn-doped with the concentration of $5.0 \times 10^{17}$ cm$^{-3}$ or is a semi-insulating material made of InP that is Fe-doped with the concentration of $5.0 \times 10^{16}$ cm$^{-3}$. The n-type InP second buried layer 60 is made of InP on the first buried layer 50, has a thickness of 0.4 μm, and is S-doped with the concentration of $7.0 \times 10^{18}$ cm$^{-3}$.

Note that, the first buried layer 50 may be a semi-insulating material made of InP doped with a material such as Ti, Co, and Ru except for Zn or Fe. Further, the first buried layer 50 may be constituted with multi-laminated layers with p-type semiconductor layers or semi-insulating material layers. As described above, the conductivity type of the first buried layer 50 needs to be p-type or semi-insulating type, and the conductivity type of the first buried layer 50 is to be referred to that different from the n-type. Thus, the first buried layer 50 may be constituted with a combination of other semiconductor layers that are different in the impurity concentration or the conductivity type.

Figure 2:
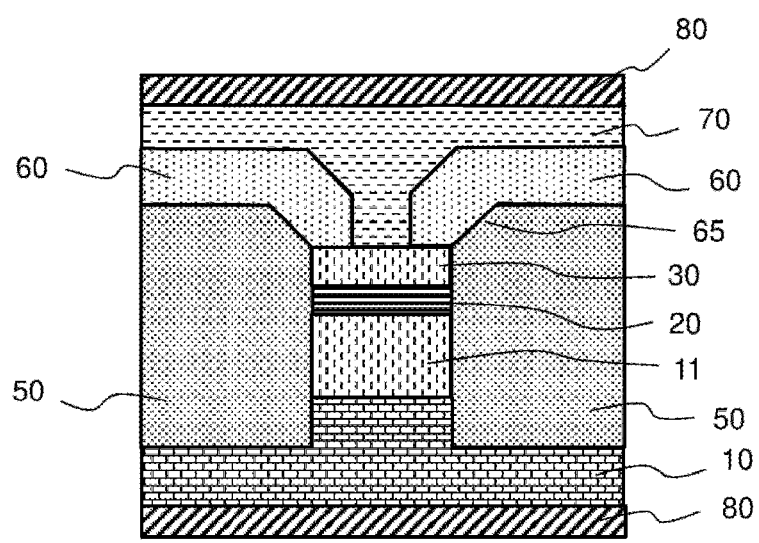
FIG. 2 is a cross-sectional view of another schematic structure of the semiconductor laser device according to Embodiment 1.

As shown in FIG. 1, on the ridge 41, the n-type InP second buried layer 60 projects over the ridge by a width a from both sides of the ridge 41 in the direction of the center of the ridge 41. The value a is typically about 0.2 μm, but it is not limited to the value as long as the range thereof is within values larger than 0 μm and smaller than ½ of the width of the ridge 41. The face of the p-type InP first cladding layer 30 at the top portion of the ridge 41 is flat, and the n-type InP second buried layer 60 also protrudes toward the top portion of the ridge 41, and at the top portion of the ridge 41, the p-type InP first cladding layer 30 and the top portion of the n-type InP second buried layer 60 are in surface contact with each other. Since the range of the width a by which the n-type InP second buried layer 60 protruding toward the center of the ridge 41 is within the values larger than 0 μm and smaller than ½ of the width of the ridge 41, the protruding portions of the n-type InP second buried layer 60 that protrude from both sides face each other to form an opening at a position corresponding to the center of the ridge 41, and the opening is referred to as a current constricting window 61. In addition, a contact surface 65 in which the side surface of the first buried layer 50 is in contact with the n-type InP second buried layer 60 does not need to be a surface perpendicular to the n-type InP substrate 10, and may be an inclined surface as shown in FIG. 2, for example. However, the surface of the n-type InP second buried layer 60 that is in contact with the surface of the p-type InP first cladding layer 30 being the top portion of the ridge 41, namely, the surface of the n-type InP second buried layer 60 that protrudes toward the top portion of the ridge 41 and also toward the center of the ridge 41 to be the surface on the side to the top portion of the ridge 41, needs to be formed so as not to exist outside the ridge 41 and to fit on the inner side of the p-type InP first cladding layer 30 within a limit of the end of the ridge 41 of the p-type InP first cladding layer 30.

The p-type InP second cladding layer 70 that is made of InP, has a thickness of 2.0 µm, and is Zn-doped with the concentration of $1.0 \times 10^{18}$ cm$^{-3}$ is buried on the p-type InP first cladding layer 30 exposed at the center of the ridge 41 and the n-type InP second cladding layer 60, and at the center of the ridge 41, the p-type InP first cladding layer 30 is in contact with the p-type InP second cladding layer 70. The electrodes 80 are provided each under the n-type InP substrate 10 and on the p-type InP second cladding layer 70. The electrodes 80 are made of a metal such as Au, Ge, Zn, Pt, or Ti.

A front end face and a rear end face of the semiconductor laser device 101, which are end faces in a direction perpendicular to the paper surface, that is, in the optical axis direction of the laser, form a resonator by (110) planes formed by cleavage. The light emission obtained in the active layer by current injection is amplified in the resonator, leading to laser oscillation. A length of the resonator is often set to 150 µm to 300 µm, but is not limited to this range.

In the semiconductor laser device 101 having the structure described above, when current is injected using the upper and lower electrodes 80, electrons are supplied from the n-type InP substrate 10 through the n-type InP cladding layer 11, and holes are supplied from the p-type InP second cladding layer 70 through the p-type InP first cladding layer 30. The holes supplied from the p-type InP second cladding layer 70 flow toward the n-type InP substrate 10. The hole current is indicated by an arrow in FIG. 1. Some of the holes among them are blocked by a potential barrier existing at the interface between the p-type InP second cladding layer 70 and the n-type InP second buried layer 60. The hole current blocked as described above flows in the direction of the n-type InP substrate 10 through the current constricting window 61 sandwiched between the layers of the n-type InP second buried layer 60. By the time when the hole current is injected into the active layer 20, the hole current passing through the current constricting window 61 spreads laterally while passing through the p-type InP first cladding layer 30. However, since the width of the current constricting window 61 is narrower than the width of the ridge 41, the holes that spread in the lateral direction are efficiently injected into the active layer 20.

Figure 3A:
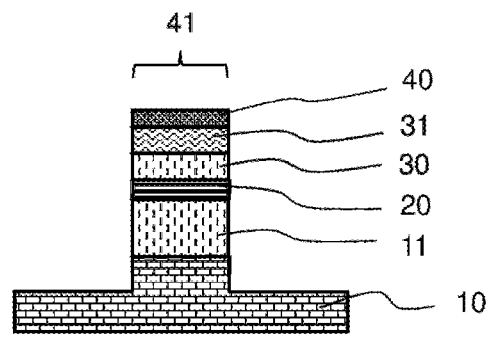
FIGS. 3A to 3C are first diagrams shown by their cross sections illustrating a manufacturing process of the semiconductor laser device according to Embodiment 1.

Next, a method of manufacturing the semiconductor laser device 101 according to Embodiment 1 will be described on the basis of FIGS. 3A to 3C and FIGS. 4A to 4C. These figures show the manufacturing process for the semiconductor laser device 101 according to Embodiment 1 in cross-sectional views. First, the n-type InP cladding layer 11, the active layer 20, the p-type InP first cladding layer 30, and an InGaAsP cap layer 31 are laminated in this order on the n-type InP substrate 10 to form a laminated structure. Although the InGaAsP cap layer 31 is an undoped layer having a thickness of 0.28 µm, it may be doped into a p-type layer or may be constituted by two or more layers of InGaAsP-based materials having different compositions. Then, as shown in FIG. 3A, a mask 40 made of an SiO$_2$ (hereinafter referred to as SiO$_2$ mask 40) is formed with the width of the ridge 41, and the ridge 41 is formed by etching both side areas of the laminated structure down to halfway in the n-type InP substrate 10 using the SiO$_2$ mask 40. The process described above will be referred to as a ridge forming process. Here, the etching is performed down to halfway in the n-type InP substrate 10, but the etching may be performed down to hallway in the n-type InP cladding layer 11 as long as the etching is performed down to a lower position than the active layer 20.

Figure 3B:
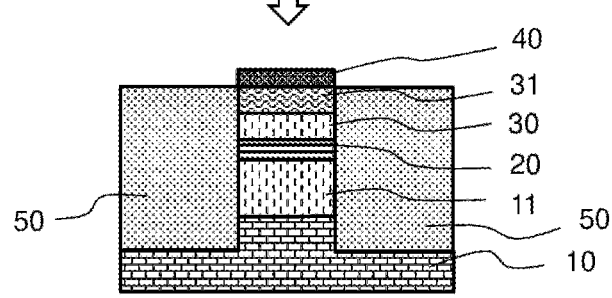

Next, as shown in FIG. 3B, the first buried layer 50 is buried in both side areas of the ridge 41 up to a position higher than the p-type InP first cladding layer 30 using the SiO$_2$ mask 40 as a selective growth mask (ridge burying process).

Figure 3C:
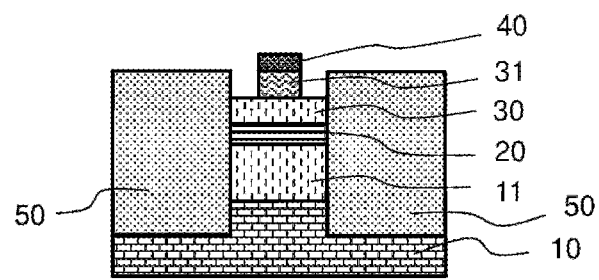

Next, as shown in FIG. 3C, after the width of the SiO$_2$ mask 40 is degenerated by using buffered hydrofluoric acid or hydrofluoric acid, the InGaAsP cap layer 31 exposed on both sides of the SiO$_2$ mask 40 are removed by tartaric acid. Then, the InGaAsP cap layer 31 remains only just under the reduced SiO$_2$ mask 40, and the p-type InP first cladding layer 30 is exposed at the top portion of the ridge 41 on both sides of the SiO$_2$ mask 40 (first cladding layer exposure step).

Figure 4A:
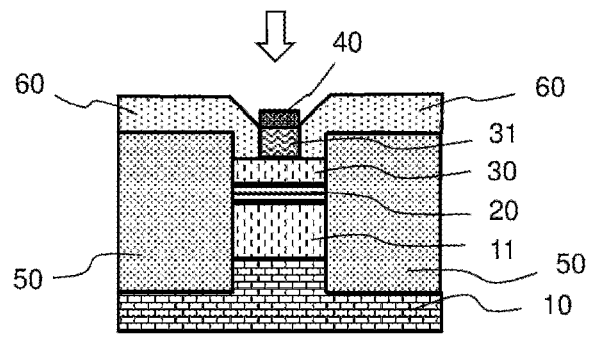
FIGS. 4A to 4C are second diagrams shown by their cross sections illustrating a manufacturing process of the semiconductor laser device according to Embodiment 1.

Subsequently, as shown in FIG. 4A, using the SiO$_2$ mask 40 as a selective growth mask, the n-type InP second buried layer 60 is grown so as to cover the p-type InP cladding layer 30 and the first buried layer 50 exposed on both sides of the SiO$_2$ mask 40 (second buried layer forming step).

Figure 4B:
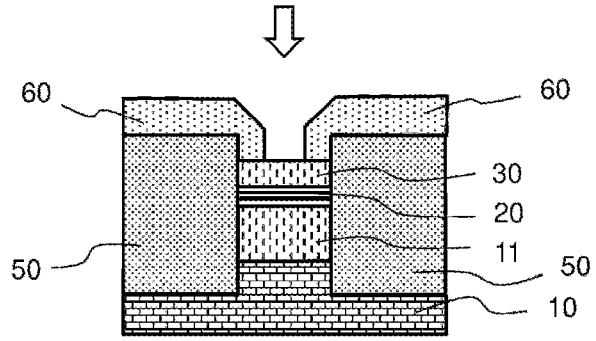

Next, as shown in FIG. 4B, the SiO$_2$ mask 40 is removed using buffered hydrofluoric acid or hydrofluoric acid, and then the InGaAsP cap layer 31 is removed using tartaric acid (cap layer removal process).

Figure 4C:
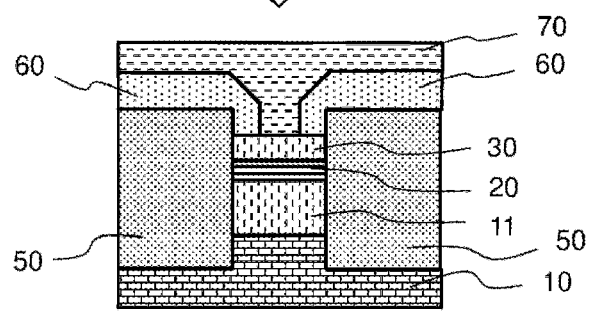

Then as shown in FIG. 4C, the p-type InP second cladding layer 70 is grown so as to cover the p-type InP first cladding layer 30 and the n-type InP second buried layer 60 (second cladding layer forming step).

Lastly, the electrodes 80 are formed on outer sides of the n-type InP substrate 10 and the p-type InP second cladding layer 70, thereby completing the semiconductor laser device 101 shown in FIG. 1.

Note that, in Embodiment 1, although the semiconductor laser device using the n-type InP substrate and the method of manufacturing the same have been described, the structure may be made by reversing the conductivity type of each of the semiconductor layers using a p-type InP substrate. In the present application, one of the p-type and n-type conductivity types may be referred to as a first conductivity type and the other as a second conductivity type. That is, the second conductivity type is the conductivity type opposite to the first conductivity type, and if the first conductivity type is p-type, the second conductivity type is n-type, and if the first conductivity type is n-type, the second conductivity type is p-type. In addition, as the semiconductor material, an example mainly using the InP-based material is described, but other semiconductor materials may be used. Therefore, in the present application, without specification of the conductivity type and the material, for example, the member described as the n-type InP substrate may be referred to as a first conductivity type substrate, the member described as the n-type InP cladding layer may be referred to as a first conductivity type cladding layer, the member described as the p-type InP first cladding layer may be referred to as a second conductivity type first cladding layer, and the member described as the p-type InP second cladding layer may be referred to as a second conductivity type second cladding layer.

Figure 12:
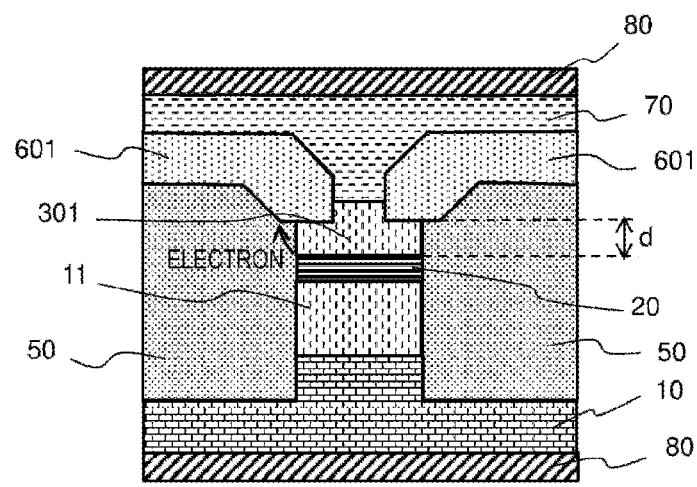
FIG. 12 is a cross-sectional view showing a schematic structure of a semiconductor laser device of the comparative example.

FIG. 12 is a cross-sectional view schematically showing a semiconductor laser device 200 of a conventional structure disclosed in, for example, Patent Document 1 as a comparative example. As shown in FIG. 12, in the conventional structure, a part of the upper face portion of the p-type InP cladding layer 301 is etched to thin the part of the p-type InP cladding layer 301, thereby reducing the width d of the hole leakage path. However, in this method, when the part of the upper face portion of the p-type InP cladding layer 301 is etched, etching cannot be stopped with good controllability, and it is difficult to leave the p-type InP cladding layer 301 with a desired thickness. When the amount of etching of the p-type InP cladding layer 301 is smaller than expected, the width d of the hole leakage path is wider than the target, and as a result, the hole leakage amount is increased to cause characteristic deterioration. As an opposite case, when the amount of etching of the p-type InP cladding layer 301 is larger than expected, it may possibly be etched up to the position to the top face of the active layer 20 without leaving the p-type InP cladding layer 301. In this case, since the active layer 20 and an n-type InP second buried layer 601 are connected, electrons tend to leak into the n-type InP second buried layer 601 before light emitting recombination in the active layer. As a result, the operating current increases.

In contrast, in Embodiment 1, since selective etching is performed using an etchant having an etching rate of the InGaAsP cap layer 31 different from that of the p-type InP first cladding layer 30, etching can be stopped with good controllability. Therefore, as shown in FIG. 1, the thickness of the p-type InP first cladding layer 30 that is epitaxially grown can be set to the width d of the hole leakage path as it is. Further, since the cap layer 31 exists between the p-type InP first cladding layer 30 and the $SiO_2$ mask 40, the $SiO_2$ mask 40 and the active layer 20 can be kept away from each other while the p-type InP first cladding layer 30 is kept thin. Thus, since the $SiO_2$ mask 40 does not distort the active layer 20, reliability of the laser device is not impaired.

In the semiconductor laser device 200 having the structure of the comparative example shown in FIG. 12, since the etching rate of the first buried layer 50 is not so different from that of the p-type InP cladding layer 301, when the width of the $SiO_2$ mask 40 as the selective growth mask is degenerated to etch the upper face portion of the p-type InP cladding layer 301 on both sides of the mask, a part of the first buried layer 50 near the ridge is also simultaneously etched. After that, when the n-type InP second buried layer 601 is grown, the bottom face of a tip end of the n-type InP second buried layer 601 formed on the first buried layer 50 comes close to the side face of the active layer 20. As a result, as indicated by an arrow in FIG. 12, electron leakage from the side face of the active layer 20 to the n-type InP second buried layer 601 through the first buried layer 50 increases.

Figure 5:
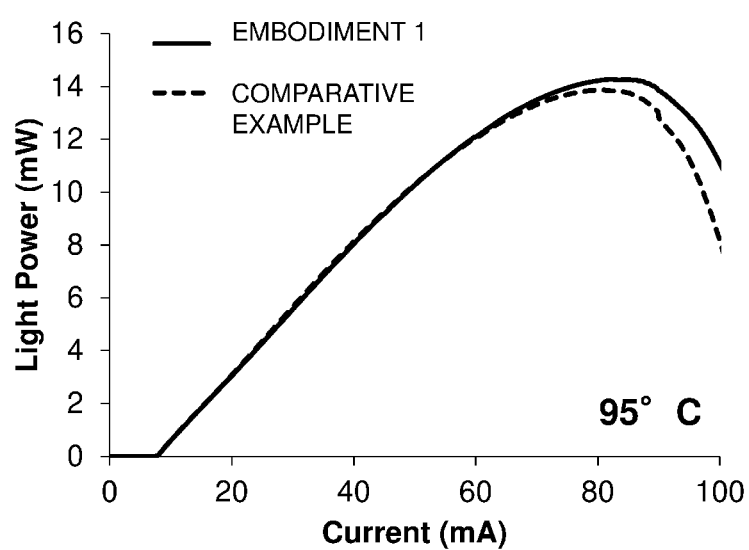
FIG. 5 is a diagram showing a comparison between operation of the semiconductor laser device according to Embodiment 1 and operation of a semiconductor laser device according to a comparative example.

FIG. 5 shows the current-optical output characteristics of the semiconductor laser device 101 according to Embodiment 1 and the semiconductor laser device 200 of the comparative example structure shown in FIG. 12, which are derived by calculation and compared. In FIG. 5, the horizontal axis indicates the current supplied to the semiconductor laser, and the vertical axis indicates the output power of the semiconductor laser device. In FIG. 5, the operating temperature is assumed to be 95° C. As shown in FIG. 5, when an operating current value is high, the semiconductor laser device of Embodiment 1 can obtain a higher optical output than the semiconductor laser device of the comparative example. This is because the structure of Embodiment 1 is less likely to cause the electron leakage from the side face of the active layer to the n-type InP second buried layer than the comparative example.

Embodiment 2

In Embodiment 1, a manufacturing method using the degeneration of the $SiO_2$ mask is shown, and then in Embodiment 2, a method of manufacturing a semiconductor laser device 101 similar to that shown in FIG. 1 will be shown in which a double mask constituted by two materials having different etching rates is used. This manufacturing method will be described referring to FIGS. 6A to 6C and FIGS. 7A to 7C.

Figure 6A:
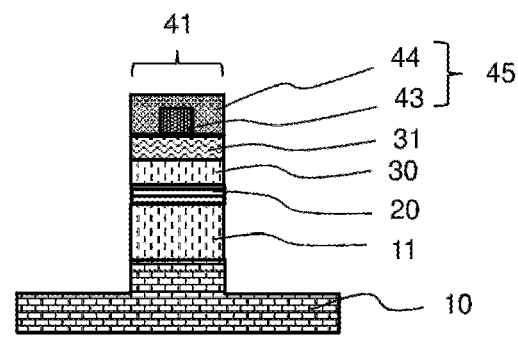
FIGS. 6A to 6C are first diagrams shown by their cross sections illustrating a manufacturing process of a semiconductor laser device according to Embodiment 2.

First, the n-type InP cladding layer 11, the active layer 20, the p-type InP first cladding layer 30, and the InGaAsP cap layer 31 are sequentially laminated on the n-type InP substrate 10. After that, a first mask 43 is formed with the width of the current constricting window 61, and a second mask 44 is formed with the width of the ridge 41 so as to cover the first mask. The first mask 43 is made of a material having a low etching rate, and the second mask 44 is made of a material having an etching rate higher than that of the first mask 43. In addition, preferably, the width of the first mask 43 is narrower than the width of the second mask 44, and the first mask 43 is centered with respect to the second mask 44. As shown in FIG. 6A, etching is performed to a position lower than the active layer by using the double mask 45 constituted by the first mask 43 and the second mask 44 to form a ridge 41.

Figure 6B:
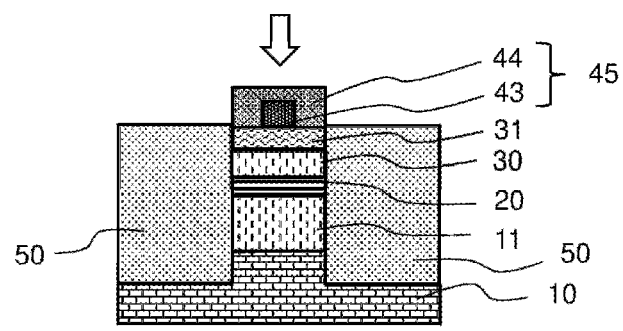
Figure 6C:
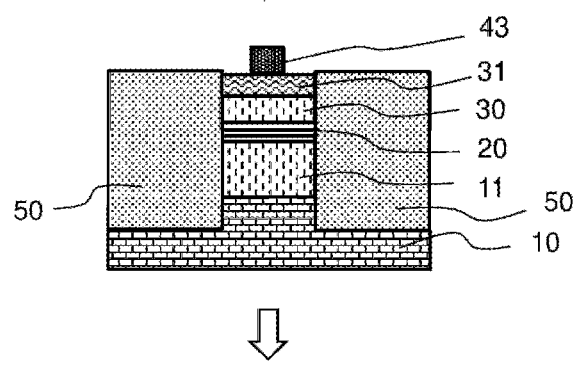

Next, as shown in FIG. 6B, the first buried layer 50 are buried in both side areas of the ridge 41 up to a position higher than the active layer. Subsequently, as shown in FIG. 6C, the second mask 44 is selectively etched. For example, when the material of the first mask 43 is $SiO_2$ and the material of the second mask 44 is SiN, and when $SF_6$ is used as the etching gas, only the second mask 44 is selectively etched using the difference in the etching rate, and the InGaAsP cap layer 31 under it can be exposed.

Figure 7A:
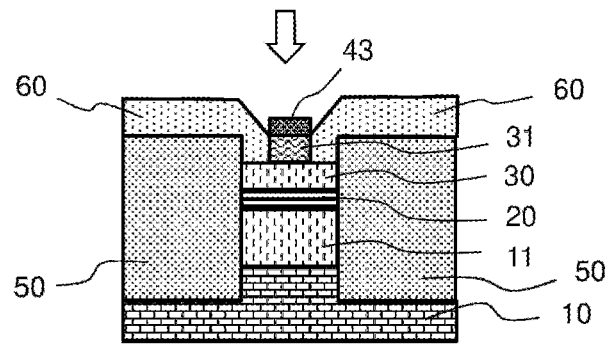
FIGS. 7A to 7C are second diagrams shown by their cross sections illustrating a manufacturing process of the semiconductor laser device according to Embodiment 2.

Next, as shown in FIG. 7A, after the InGaAsP cap layer 31 exposed on both sides of the first mask 43 are removed using tartaric acid, the n-type InP second buried layer 60 is grown so as to be buried on the first buried layer 50 and the ridge 41.

Figure 7B:
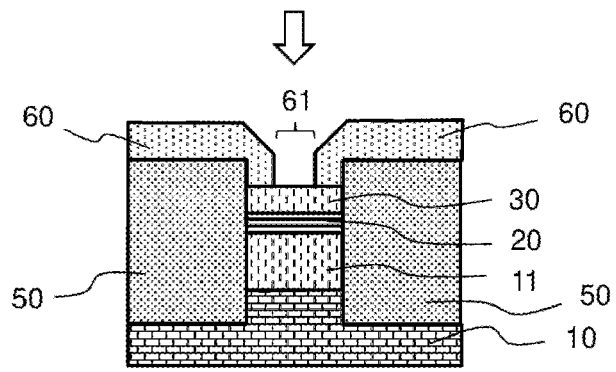
Figure 7C:
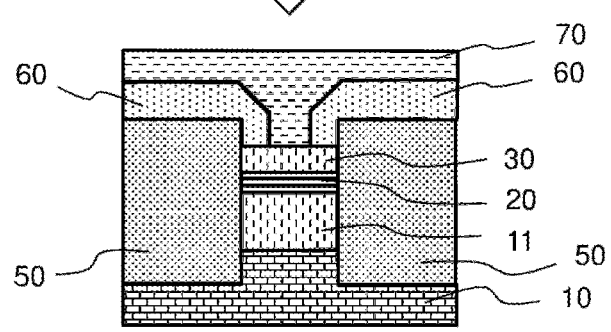

Next, as shown in FIG. 7B, after the first mask 43 is removed using buffered hydrofluoric acid or hydrofluoric acid, the InGaAsP cap layer 31 is removed using tartaric acid. After that, as shown in FIG. 7C, the p-type InP second cladding layer 70 is grown so as to cover the p-type InP first cladding layer 30 and the n-type InP second buried layer 60. Lastly, the electrodes 80 are formed each under the n-type InP substrate 10 and on the p-type InP second cladding layer 70.

Using the double mask constituted by two materials having different etching rates, it is also possible to manufacture the semiconductor laser device 101 shown in FIG. 1 in which the electron leakage from the side face of the active layer 20 to the n-type InP second buried layer 60 is unlikely to occur and a high optical output can be obtained.

Embodiment 3

Figure 8:
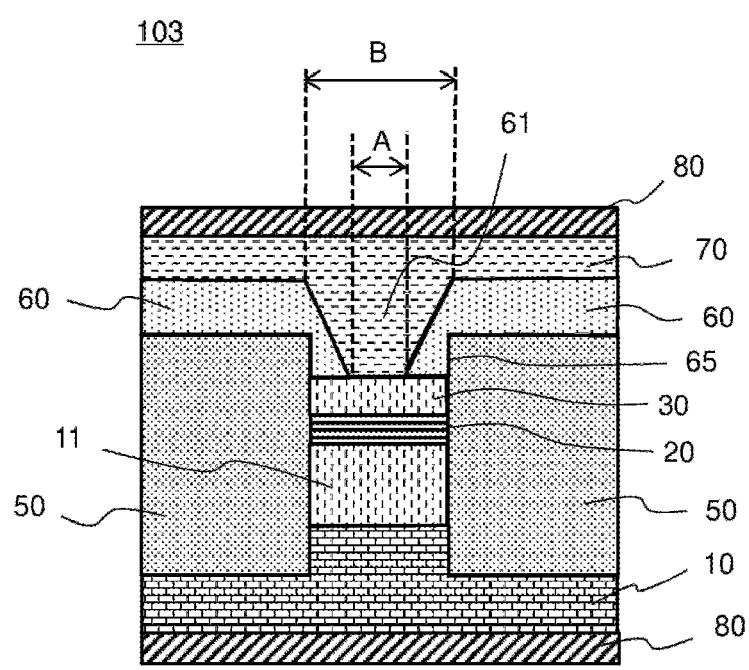
FIG. 8 is a diagram for explaining operation of a semiconductor laser device according to Embodiment 3.

FIG. 8 is a cross-sectional view showing a structure of a semiconductor laser device 103 according to Embodiment 3. In Embodiment 3, as shown in FIG. 8, in the current constricting window 61 sandwiched between the layers of the n-type InP second buried layer 60, the width A of the opening of the current constricting window on the side of the p-type InP first cladding layer 30 is the narrowest and the width B of the opening on the side opposite to the p-type InP first cladding layer 30 is the widest. The width A is narrower than the width of the ridge 41, but the width B may be wider or narrower than the width of the ridge 41 as long as the width B is wider than the width A. Other structures are the same as those of the semiconductor laser device 101 of Embodiment 1, and description thereof will be omitted.

The semiconductor laser device 103 of Embodiment 3 is manufactured, for example, as follows. The steps up to the step of forming the second buried layer for forming the n-type InP second buried layer 60 are the same as those in Embodiment 1 or 2. Then, before the p-type InP second cladding layer 70 is grown, the shape of the n-type InP second buried layer 60 is altered by mass transport by high-temperature annealing. As a result, in the current constricting window 61, the width B of the uppermost side becomes wider than the width A of the lowermost side. Others in the manufacturing method are the same as those of Embodiment 1, and the description thereof is omitted.

If the width of the current constricting layer 61 sandwiched between the layers of the n-type InP second buried layer 60 is narrow, the cross-sectional area through which the current flows becomes narrow, causing the element resistance to increase. In the case where the thickness in the direction of the current flow in the current constricting window 61 is the same, and when the semiconductor laser device 101 of Embodiment 1 is compared with the semiconductor laser device 103 of Embodiment 3. a region in which the cross-sectional area through which the current flows is wider is increased in the semiconductor laser device 103 of Embodiment 3. Thus, the element resistance in the semiconductor laser device 103 of Embodiment 3 can be reduced more than the semiconductor laser device 101 of Embodiment 1.

Embodiment 4

Figure 9:
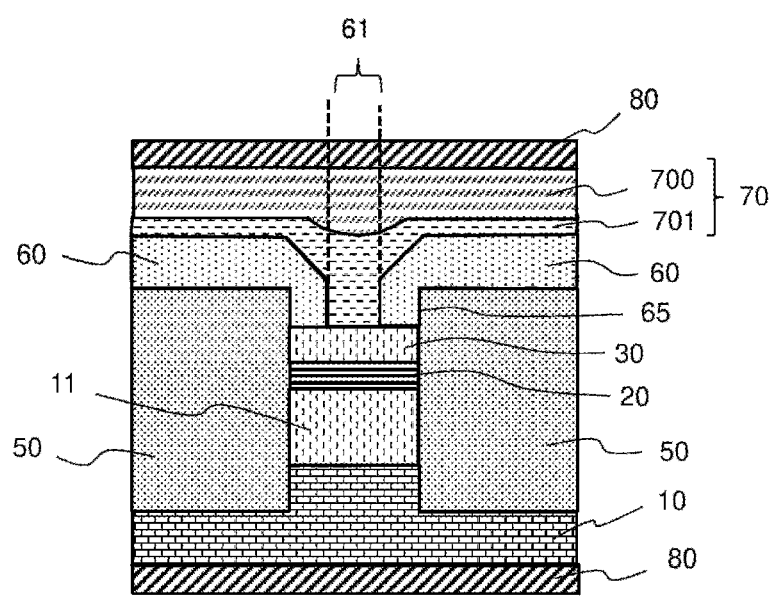
FIG. 9 is a diagram for explaining operation of a semiconductor laser device according to Embodiment 4.

FIG. 9 is a cross-sectional view showing a semiconductor laser device 104 according to Embodiment 4. In Embodiment 4, as shown in FIG. 9, the p-type InP second cladding layer 70 has a two-layer structure in which a high carrier concentration layer 701 having a high carrier concentration on the side to the current constricting window 61 and a low carrier concentration layer 700 having a low carrier concentration on the side to the electrode 80 are included. In the case of manufacturing the semiconductor laser device 104 shown in FIG. 9, a high carrier concentration layer 701 of high carrier concentration p-type InP is buried in the current constricting window 61 sandwiched between the layers of the n-type InP second buried layer 60, and then a low carrier concentration layer 700 of p-type InP having a carrier concentration lower than that of the high carrier concentration layer 701 is grown thereon. For example, in a case where the low carrier concentration layer 700 is an InP layer that is Zn-doped with the concentration of $1.0 \times 10^{18}$ cm$^{-3}$ and is the same as the p-type InP second cladding layer 70 of Embodiment 1, the high carrier concentration layer 701 has a carrier concentration higher than that of the low carrier concentration layer 700, is an InP layer Zn-doped with the concentration of $3.0 \times 10^{18}$ cm$^{-3}$, and has a thickness of 0.3 μm. Others in the manufacturing method are the same as those of Embodiment 1 or 2, and the description thereof is omitted.

The current constricting window 61 sandwiched between the layers of the n-type InP second buried layer 60 has a smaller cross-sectional area through which the current flows than in other regions, causing the element resistance to increase. In the semiconductor laser device 104 of Embodiment 4, the resistance in the current constricting window 61 can be reduced by burying in the current constricting window 61, the high carrier concentration layer 701 having a carrier concentration higher than that of the low carrier concentration layer 700 located on the electrode side. However, since the light absorption increases when the carrier concentration is high, the light conversion efficiency decreases, if the entire second cladding layer is a layer having the high carrier concentration. Therefore, it is necessary to select the ratio of the high carrier concentration layer 701 to the low carrier concentration layer 700 in the P-type InP second cladding layer 70.

According to the semiconductor laser device 104 of Embodiment 4, in comparison with the case where, in the semiconductor laser device 101 of Embodiment 1 shown in FIG. 1, the p-type InP second cladding layer 70 having the same carrier concentration as that of the low carrier concentration layer 700 in Embodiment 4 is used, it is possible to obtain a semiconductor laser device having a lower element resistance.

Embodiment 5

Figure 10A:
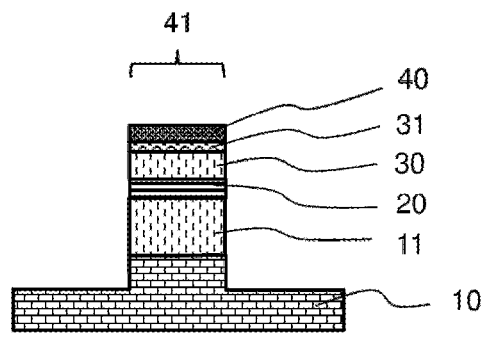
FIGS. 10A to 10C are first diagrams shown by their cross sections illustrating a manufacturing process of a semiconductor laser device according to Embodiment 5.

FIGS. 10A to 10C and FIGS. 11A to 11C are cross-sectional views showing steps in a method of manufacturing a semiconductor laser device according to Embodiment 5. In Embodiment 5, a method of manufacturing a semiconductor laser without using degeneration of a mask is shown. In FIG. 10A, the ridge 41 is formed by the same method as in Embodiment 1, but the thickness of the InGaAsP cap layer 31 is set to be, for example, 10 nm or less, which is thinner than that in the manufacturing method described in Embodiment 1. In Embodiments 1 to 4. the InGaAsP cap layer 31 used in the manufacturing process is finally completely removed and is not used as a component of the semiconductor laser device. In Embodiment 5, as will be described later, the InGaAsP cap layer 31 a part of which remains is used as a component of the semiconductor laser device. When the InGaAsP cap layer 31 is used as a component of a semiconductor laser device, the InGaAsP cap layer 31 is preferably as thin as possible, because InGaAsP has a larger absorption coefficient of light than InP and causes an increase in the absorption loss of laser light. Note that, the conductivity type of the InGaAsP cap layer 31 is assumed to be p-type here.

Figure 10B:
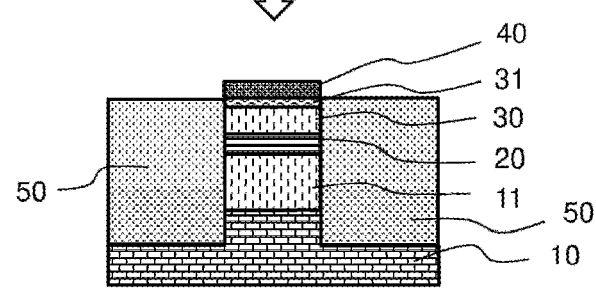
Figure 10C:
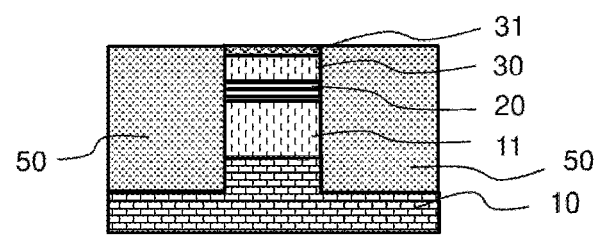
Figure 11A:
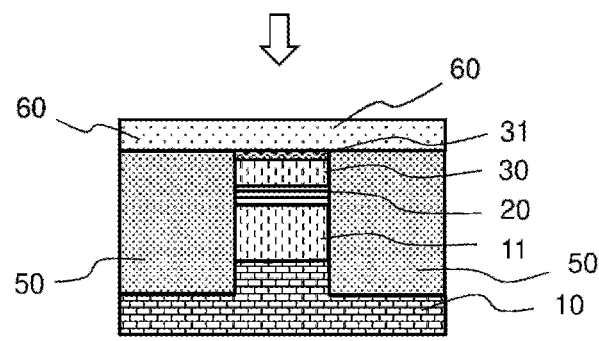
FIGS. 11A to 11C are second diagrams shown by their cross sections illustrating a manufacturing process of the semiconductor laser device according to Embodiment 5.

Next, as shown in FIG. 10B, the first buried layer 50 is buried in the ridge 41 up to a position higher than the top of the active layer 20. Then, the SiO$_2$ mask 40 is removed as shown in FIG. 10C, and the n-type InP second buried layer 60 is grown so as to entirely cover the first buried layer 50 and the ridge 41 as shown in FIG. 11A.

Figure 11B:
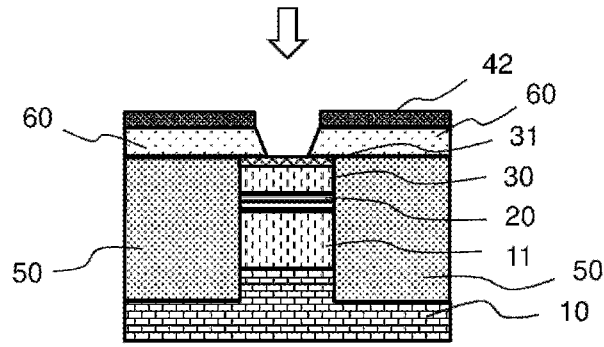

Next, an SiO$_2$ mask 42 for selective etching is then formed on the n-type InP second buried layer 60 in preparation for forming the current confinement window 61. After that, when the n-type InP second buried layer 60 is etched using, for example, hydrochloric acid, since the etching rate of InP with respect to hydrochloric acid is higher than that of InGaAsP, etching can be stopped on the InGaAsP cap layer 31 with good controllability as shown in FIG. 11B.

Next, the InGaAsP cap layer 31 exposed at the upper face in the center of the ridge 41 is removed using tartaric acid, and the SiO$_2$ mask 42 is removed using hydrofluoric acid.

Figure 11C:
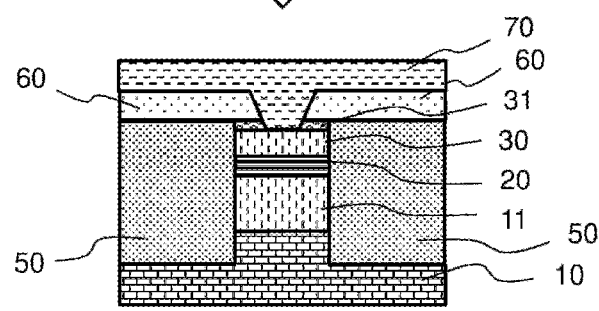

Next, as shown in FIG. 11C, the p-type InP second cladding layer 70 is grown so as to be buried on the n-type InP second buried layer 60 and the ridge 41. Since the following step is the same as Embodiment 1, the description thereof will be omitted.

As shown in FIG. 11C, in the semiconductor laser device manufactured by the method of manufacturing the semiconductor laser device according to Embodiment 5, the p-type InGaAsP cap layer 31 remains as a structure between the n-type InP second buried layer 60 protruding toward the center of the ridge 41 and the p-type InP first cladding layer 30. Even in the semiconductor laser device having such a structure, as described in the first embodiment, the electron leakage from the side face of the active layer to the n-type InP second buried layer 60 is not likely to occur.

Although various exemplary embodiments and examples are described in the present application, various features, aspects, and functions described in one or more embodiments are not inherent in a particular embodiment, and can be applicable alone or in their various combinations to each embodiment. Accordingly, countless variations that are not illustrated are envisaged within the scope of the art disclosed herein. For example, the case where at least one component is modified, added or omitted, and the case where at least one component is extracted and combined with a component in another embodiment are included.

REFERENCE SIGNS LIST 10 n-type InP substrate (first conductivity type substrate), 11 n-type InP cladding layer (first conductivity type cladding layer), active layer, 30 p-type InP first cladding layer (second conductivity type first cladding layer), 31 cap layer, 40 mask, 41 ridge, 43 first mask, 44 second mask, 45 double mask, 50 first buried layer, 60 second buried layer, 61 current constricting window, 70 p-type InP second cladding layer (second conductivity type second cladding layer)

The invention claimed is:

1. A semiconductor laser device comprising:
a ridge that is laminated with a cladding layer of a first conductivity type, an active layer, and a first cladding layer of a second conductivity type opposite to the first conductivity type in order in a vertical direction on a surface of a substrate of the first conductivity type, and has a flat top portion;
a first buried layer that is buried on both a first side and a second side of the ridge to a position higher than the first cladding layer;
a second buried layer of the first conductivity type that covers the first buried layer, and protrudes toward a center of the ridge to form an opening as a current constricting window formed by protruding portions facing each other;
a second cladding layer of the second conductivity type that is buried on the second buried layer and in the current constricting window; and
a cap layer of the second conductivity type that is sandwiched between the second buried layer and the first cladding layer, directly contacting the second buried layer, and located on the top portion of the ridge in areas adjacent to the first and second sides, wherein
the second cladding layer is contact with the first cladding layer at the center of the top portion of the ridge, and
the cap layer is positioned between the first cladding layer and the second buried layer in the vertical direction.

2. The semiconductor laser device according to claim 1, wherein a width of the opening on a side to the first cladding layer of the current constricting window is narrower than the width of the opening on an opposite side to the first cladding layer.

3. The semiconductor laser device according to claim 1, wherein the second cladding layer is constituted by a high carrier concentration layer that is buried in the current constricting window and a low carrier concentration layer having a carrier concentration lower than that of the high carrier concentration layer.

4. The semiconductor laser device according to claim 1, wherein the substrate is an InP substrate, and the first buried layer is an Fe-doped InP layer or a Ru-doped InP layer.

5. The semiconductor laser device according to claim 2, wherein the second cladding layer is constituted by a high carrier concentration layer that is buried in the current constricting window and a low carrier concentration layer having a carrier concentration lower than that of the high carrier concentration layer.

6. The semiconductor laser device according to claim 2, wherein the substrate is an InP substrate, and the first buried layer is an Fe-doped InP layer or a Ru-doped InP layer.

7. The semiconductor laser device according to claim 3, wherein the substrate is an InP substrate, and the first buried layer is an Fe-doped InP layer or a Ru-doped InP layer.

8. The semiconductor laser device according to claim 5, wherein the substrate is an InP substrate, and the first buried layer is an Fe-doped InP layer or a Ru-doped InP layer.

9. A method for manufacturing a semiconductor laser device comprising the steps of:
a ridge forming step in which a laminated structure is formed by laminating a cladding layer of a first conductivity type, an active layer, a first cladding layer of a second conductivity type opposite to the first conductivity type, and a cap layer made of a semiconductor material different from the second conductivity type first cladding layer in order in a vertical direction on a surface of a substrate of the first conductivity type, and a first side area and a second side area of the laminated structure are etched to a position closer to the substrate than the active layer to form a ridge having a first side and a second side;
a ridge burying step in which a first buried layer of a conductivity type different from the first conductivity type is buried in both the first side and the second side of the ridge to a position higher than the first cladding layer;
a second buried layer forming step in which a second buried layer of the first conductivity type is grown so as to cover the ridge and the first buried layer, and directly contact the cap layer;
a cap layer exposing step in which the second buried layer at a position corresponding to a center of the ridge is etched to expose the cap layer at the center of the ridge;
a first cladding layer exposing step in which the cap layer exposed at the center of the ridge is etched to expose the first cladding layer; and
a second cladding layer forming step in which a second cladding layer of the second conductivity type is grown so as to be buried on the second buried layer, the first cladding layer exposed at the center of the ridge and an exposed side face of the cap layer located between the second buried layer and the first cladding layer, wherein
the cap layer is positioned between the first cladding layer and the second buried layer in the vertical direction.

10. The semiconductor laser device according to claim 1, wherein the cap layer has a thickness of 10 nm or less.

11. The method for manufacturing a semiconductor laser device according to claim 9, wherein the cap layer has a thickness of 10 nm or less.

12. The method for manufacturing a semiconductor laser device according to claim 9, wherein the cap layer is the second conductivity type.

\* \* \* \* \*